United States Patent Office 3,499,260
Patented Mar. 10, 1970

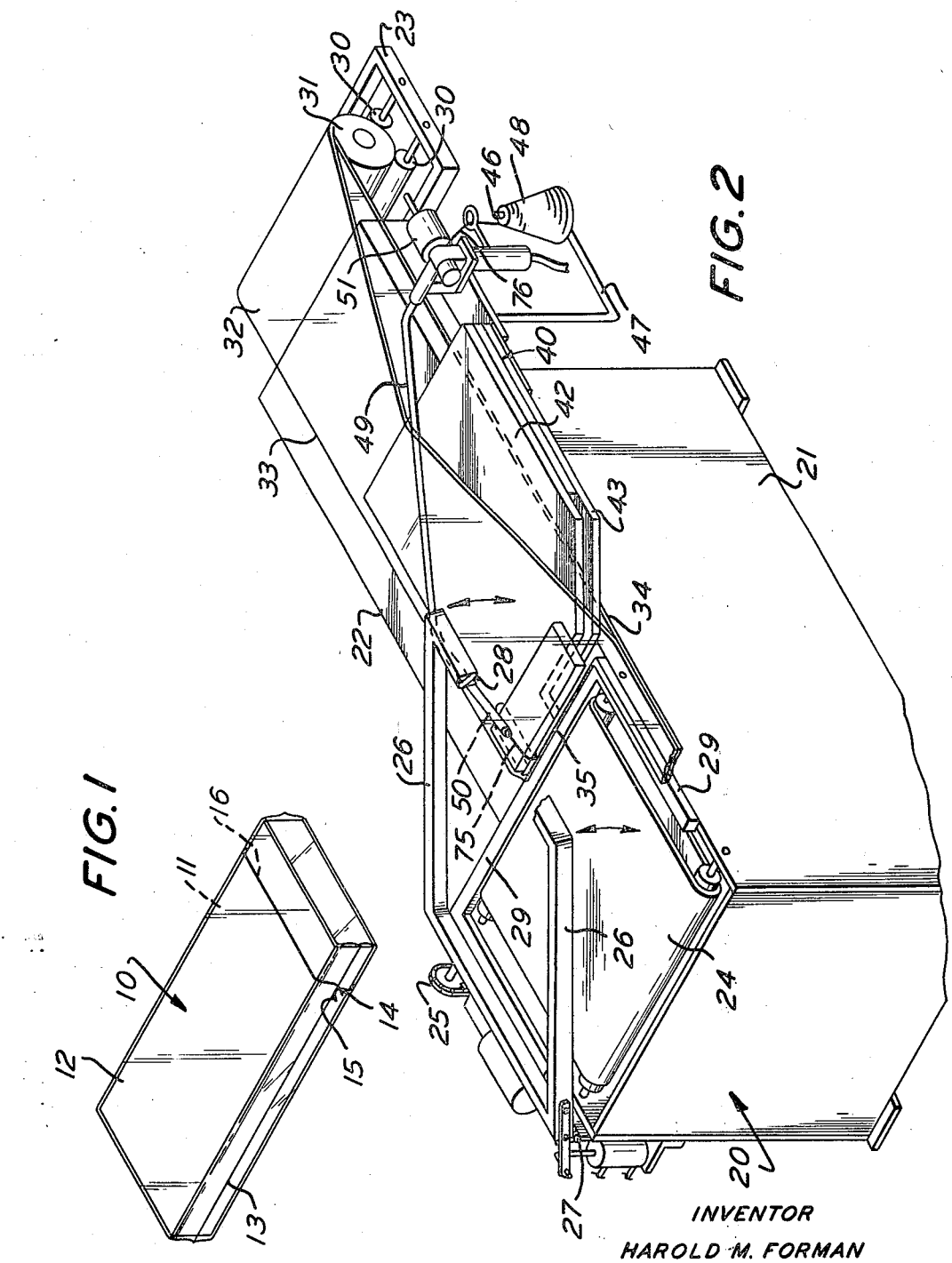

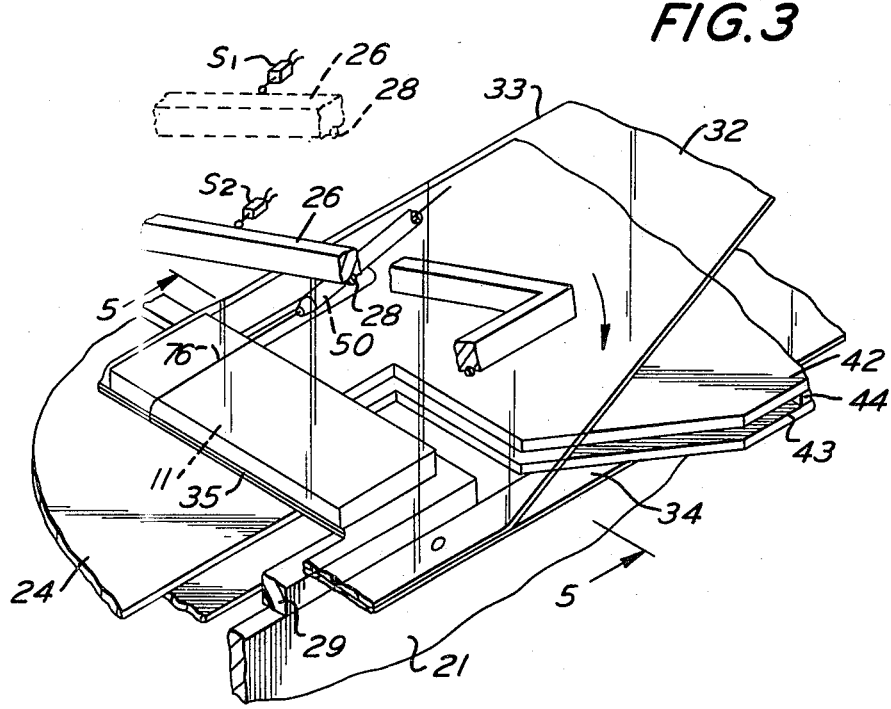
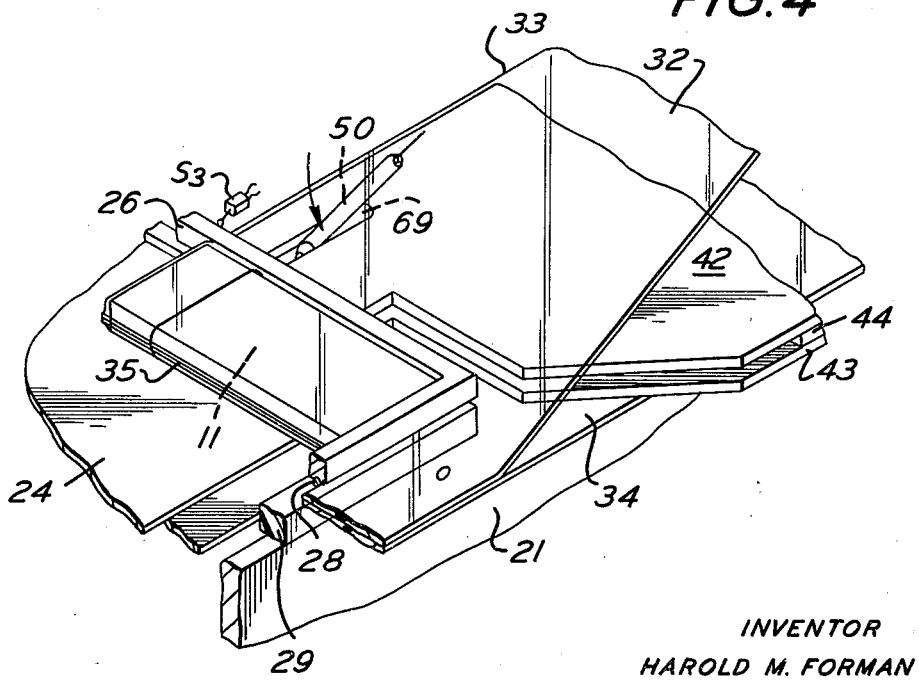

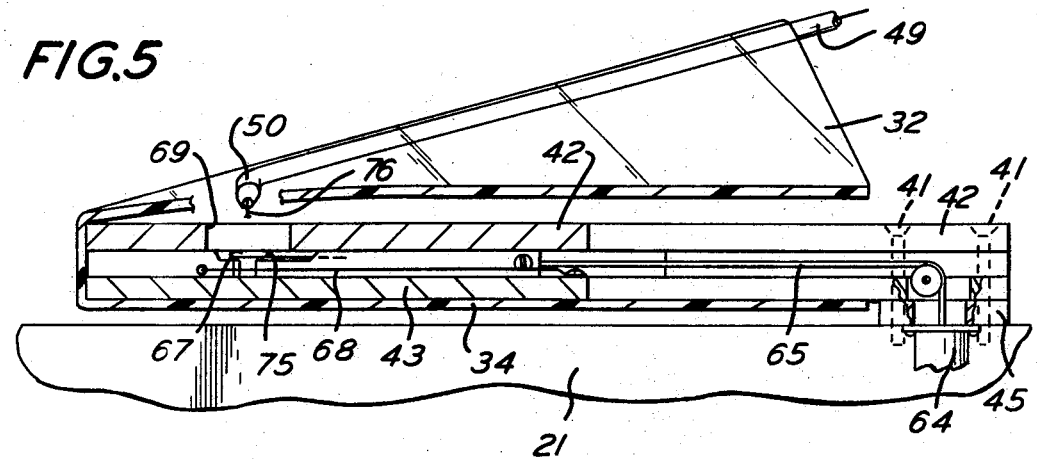
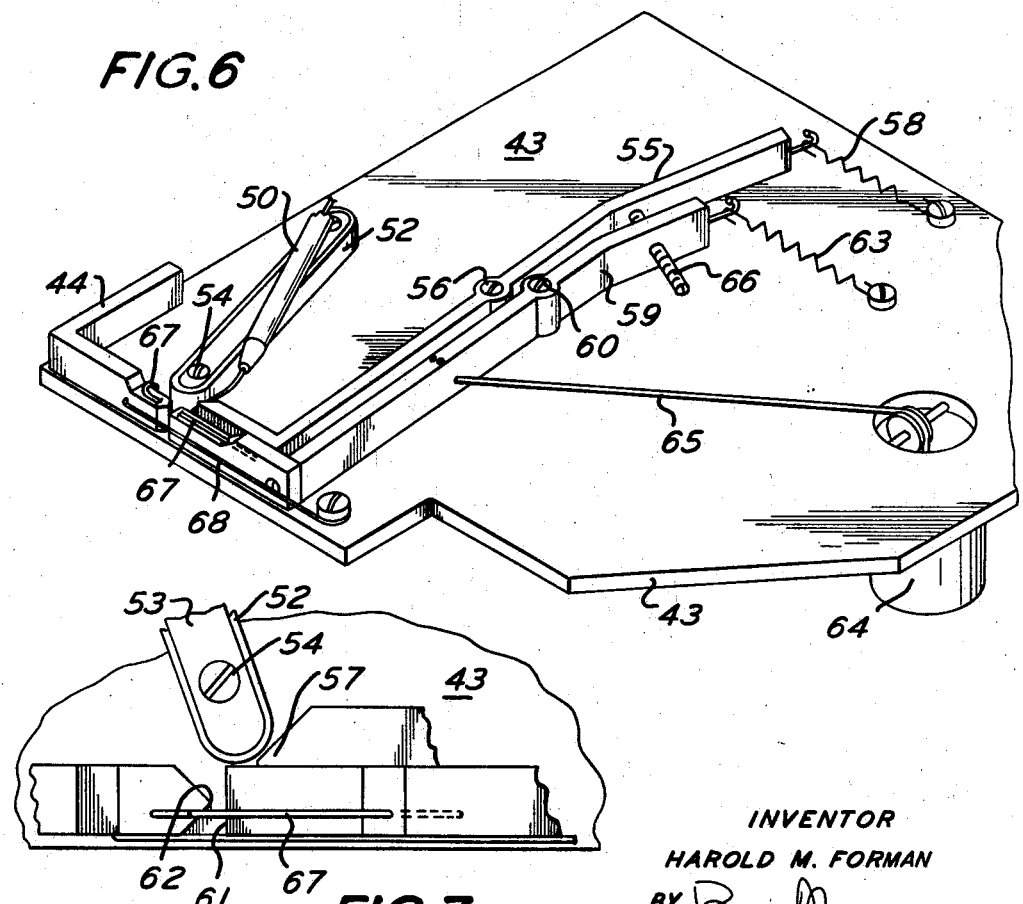

3,499,260
METHOD OF INCORPORATING A CUTTER IN OVERWRAPPED PACKAGES AND RELATED APPARATUS
Harold M. Forman, 2510 Grant Road, Broomall, Pa. 19008
Filed Jan. 16, 1968, Ser. No. 698,214
Int. Cl. B65b 9/02, 51/26, 61/18
U.S. Cl. 53—14                                6 Claims

ABSTRACT OF THE DISCLOSURE

A method of positioning a length of flexible cutter material about an item to be wrapped is provided, which involves grasping one end of a supply of flexible cutter material and advancing the item in contact with the material so that additional material pays off the other stored end as the item is moved a predetermined distance. With the item thus encompassed by flexible cutter material, the end is released, a new end (formerly an intermediate portion) is grasped and the cutter material severed to free the item from the cutter supply.

An apparatus suitable for practicing the method, and adaptable for use with conventional film wrapping machinery, involves a clamp beneath a table across which the item will travel and a nutating wand leading cutter material from a supply source to the clamp. This wand has an upper position wherein it permits the item to pass between its end and the clamp to thus pick up the length of cutter as it moves and a lower position where it permits the clamp to grasp a new end of cutter material after which a knife, provided proximate the clamp, severs the old length of cutter material from the newly clamped end.

BACKGROUND OF THE INVENTION

Field of the invention

This invention pertains to packages and packaging machinery. More particularly it relates to a method for incorporating a flexible cutter into a package which is made by overwrapping an item with flexible film. The cutter is of the type which can be used for quickly opening the package by progressively tearing the overwrapping material.

The invention also relates to apparatus suitable for practicing the method of the invention, especially in connection with existing film wrapping machinery.

Description of the prior art

In my own Patent No. 3,352,480 entitled "Quick Opening Shrink Film Package and Packaging Method" various packages are disclosed, all of which may be opened quickly by use of a flexible cutter incorporated in the package between the wrapped item and the overwrapping film. Other versions of the package, also incorporating a flexible cutter, are described in my co-pending application, Ser. No. 681,854 filed Nov. 9, 1967 and entitled "Quick-Opening Shrink Film Package."

These packages demonstrate the desirability of incorporating flexible cutters during the course of a packaging operation. However, there is in the prior art very little which can be used as a guide to the developing of methods for incorporating lengths of such cutter material. Nor is there machinery for practicing methods of this type. Consequently, further development in this field has been retarded by the absence of such methodology and apparatus.

On the other hand, the prior art is replete with machines for overwrapping items with flexible films, particularly including, for example, wrapping machinery incorporating heat-sealing elements which is used with shrink film (this term being defined in my prior patent refererd to above). Any method of incorporating lengths of flexible cutter should, to have maximum economic utility, be compatible with existing machinery and be capable of practice by an apparatus which can be utilized with such machinery as an accessory.

SUMMARY OF THE INVENTION

Briefly summarized, the invention pertains to a method of positioning a flexible cutter about an item to be overwrapped with film. As used henceforth herein the term flexible cutter means a strand, filament, wire, group of filaments, ribbon or tape made of textiles, metals or plastic provided only that such a cutter have a tensile streng'h sufficient to enable it to be used to cause progressive tearing of an overwrapping film. The overwrapping films with which the invention may be practiced include cellophane, polyvinyl chloride, various polyesters and the like all of which are well known in the art. Preferred cutting materials include cord or string made of cotton and preferred films are those polyvinyl chloride films which are customarily used in heat sealed packages such as, for example, axially-oriented polyvinyl chloride films.

The method consists of grasping an end of a length of cutting material at a package site such as, for example, the point of convergence of two lengths of flexible film and placing an item to be wrapped at the site in contact with an intermediate portion of the cutter. Since the other end of the cutting material is stored in a manner whereby it can be paid out, advancement of the item to be wrapped along with the film in a horizontal plane, while not advancing the point of grasping, causes a length of cutter to be paid out and the cutting material to thus encompass the package. The grasped end is then released and, in its place, a new intermediate portion is grasped which, for the next item to be wrapped, will constitute the end of the cutter. After the second grasping, the cutting material is severed between the newly grasped portion and the item to thus provide an item encircled by cutting material which can be subjected to the next step in a total wrapping operation. Modifications of the method provide for the separation of the two ends of the material which surrounds the item and for the tucking in of one of these ends under the item so that only one end protrudes beyond its perimeter.

An apparatus is also disclosed which may be used to practice the method. In this apparatus a work table or station is provided beneath which there is a clamp. The table is positioned between two pieces of film with which an item will be overwrapped. A spindle is provided, remote from the table on which is stored a quantity of cutter material and this material is lead, via a nutating (i.e. nodding) wand or conduit which leads the cutter material, to the clamp. This wand has two positions. In its upper position it causes the cutter material to span from the clamp across the path of travel of an item to be wrapped and the item, passing under the wand, picks up the cord or cutter and when moved a predetermined distance causes a given length of cutter material to pay off the spindle. After this has happened, the clamp opens to release the end of the cutter and the wand dips to a new position in which it places a new intermediate portion of cutter materials within the clamp. The clamp closes and a knife, adjacent the clamp severs the old cutter material thus freeing the package for further wrapping. Sequencing means are provided for operating the wand, clamp and knife and means are also provided for moving the released end of the cutter away from the clamp end. Means may also be provided for flicking one end of the cutting material under the package so that only the other end protrudes beyond its perimeter.

Accordingly, it is an object of the invention to provide a method of positioning a flexible cutter about an item to be overwrapped with film, which method can be practiced by hand or mechanically.

An additional object of the invention is to provide a method whereby conventional packages, involving an item overwrapped with flexible film, can be rendered quick-opening by the incorporation therein between the item to be wrapped and the film of a cutter which can be used to cause progressive tearing of the film in a predetermined direction.

It is a further object of the invention to provide apparatus for positioning a length of flexible cutter material about an item, said length being part of a larger supply of cutter material and being cut off therefrom by said apparatus.

An additional object of the invention is to provide apparatus of the kind described which is economical to produce, foolproof in operation, easy to maintain and adaptable as an accessory to a large number of existing packaging machines.

These and other objects of the invention will be apparent to those skilled in the art from a consideration of the disclosure herein.

The abstract of the disclosure and the summary of the invention presented above are intended merely as aids in information retrieval and are not to be construed so as to limit or define the extent of the invention. This is to be done only on the basis of a reasonable interpretation of the appended claims consistent with the instant disclosure.

BRIEF DESCRIPTION OF THE DRAWINGS

In the drawings, wherein like reference numerals designate like parts:

FIGURE 1 is a perspective view of a quick-opening package incorporating a cutter.

FIGURE 2 represents a fragmentary perspective view of a conventional packaging machine incorporating, as an accessory, an apparatus of the invention.

FIGURE 3 represents a fragmentary perspective view, partially in section, of a portion of the apparatus shown in FIGURE 2, with an item to be wrapped shown thereon in a first position.

FIGURE 4 is a fragmentary perspective view, partly in section, of the same portion of the apparatus shown in FIGURE 4 but with the item thereon shown in a second position.

FIGURE 5 represents a fragmentary section taken along line 5—5 of FIGURE 4.

FIGURE 6 is a perspective view showing internal details of construction of an apparatus embodying the invention.

FIGURE 7 represents an enlarged fragmentary plan view of a portion of the apparatus shown in FIGURE 6.

DESCRIPTION OF THE PREFERRED EMBODIMENTS

In FIGURE 1 a package, generally 10 is shown which includes an item 11 which has been overwrapped with flexible film 12. This particular package has utilized heat sealing techniques and consequently contains at least one heat sealed edge 13. In subsequent operations, not shown here, this package will be heat shrunk in an air tunnel so that the film 12 abuts item 11 in tensioned skin-tight juxtaposition. The package also contains a cord or cutter having a first end 14, a second end 15 and an intermediate portion 16. The two ends, in this particular package, extend to the exterior through heat sealed edge 13 whereas the intermediate portion 16 is between the item 11 and the flexible film 12. The package is opened by grasping ends 14 and 15 and pulling them so as to cause progressive tearing of the film. In order to make grasping easy it is desirable that ends 14 and 15 be spaced apart as they come through edge 13. Alternatively, end 14 may be tucked within the confines of the package and anchored or frictionally detented therein so that pulling of end 15 will not cause displacement of the cutter. Packages of this type are described in my prior patents referred to above and techniques for frictionally detenting the cutter include coating of the cutter with materials adapted to increase the coefficient of friction thereof.

FIGURE 2 shows a film overwrapping machine, in this case a heat sealer, to which has been added accessory devices whereby the machine is capable of being used in accordance with the method of the invention.

The basic machine, which is well known in the prior art, will be described sketchily since those of ordinary skill are well aware of the details of construction of such a machine and how it functions. These machines are generally known as "L-sealers" because they utilize heat sealable film and make two heat sealed edges at right angles to each other simultaneously in a single operation.

The heat sealing machine generally 20 includes a base 21 having a work table or positioning station 22, a film storage section 23 on one side of the work table and a sealing section on the other side. The sealing section includes a conveyor 24 provided with suitable drive means 25 and a sealing frame 26 which is pivotally mounted on a shaft 27. The portion of frame 26 which actually seals includes a heated wire 28 which, when in sealing position, abuts a sealing anvil 29. In FIGURE 2 the sealing frame is shown wide open. In FIGURE 3 the fragmentary dotted representation shows the frame wide open whereas the solid representation shows the frame about half closed. In FIGURE 4 the frame is shown in the heat sealing position with wire 28 in contact with anvil 29.

Film storage section 23 includes a plurality of rollers 30 upon which rests a roll of wrapping film 31. In this particular embodiment, the machine utilizes a single roll of folded film which thus provides a top film 32 a center fold 33 and a bottom film 34. Center fold 33 maintains its identity throughout the packaging operation and becomes one edge of the package. Prior art machines, alternatively, use a single roll of film and provide means for folding it prior to packaging and still other machines use two separate rolls of film thus necessitating the creation of sealed edges all around the item to be wrapped. These particular details, however, do not affect the method of the invention.

The fundamentals of the sealing operation may best be understood with reference to the figures. In FIGURE 2 the item to be wrapped is located in a packaging site located between films 32 and 34. The site may be described as a corner pocket one side of which is center fold 33 and the other side of which is a heat sealed edge 35 which was formed in the previous cycle of operation. In FIGURE 3 the item has been advanced onto conveyor 24 and with it has moved the packaging site. In FIGURE 4, the sealing frame 26 is simultaneously creating two new edges; a short edge opposite fold 33 and a long edge opposite edge 35. In so doing it is not only completing the wrapping of the item 11 but is also forming another packaging site for the next cycle of operations. It should be noted that heated wire 28 not only seals the film but also cuts it; but the cord or cutter is chosen so that it is not severed nor charred by the heated wire.

Having reviewed the fundamentals of the overwrapping operation, we can now consider the embodiment of the invention shown in the drawings. As best seen in FIGURE 2, the apparatus of the invention comprises a housing generally 40 which is mounted on base 21 as with a plurality of screws 41. The housing includes a cantilevered table portion having a top plate 42, a bottom plate 43 and intermediate spacers 44. The table may be adjusted in position with respect to the base by utilizing devices such as an adjusting plate 45.

The housing also includes a spindle 46 mounted remotely from the table as with a bracket 47 upon which is mounted a supply of flexible cutter material such as, for example, cone-shaped spool 48. Also mounted on the housing is a nutating wand 49 having a terminus 50 and which is pivotally mounted on housing 40. A motor 51 which may be electric, pneumatic or hydraulic causes nutation of wand 49 between a first or upper position shown, for example, in FIGURE 3 and a lower position shown in FIGURE 4.

As best seen in FIGURE 6, there are located within the space between top plate 42 and bottom plate 43 a plurality of components. The first of the components is a clamp which comprises a yieldable bumper 52 which may conveniently consist of a band of rubber mounted about an elongated block 53 affixed to plate 43 as with screws 54. Bumper 52, which is fixed in position, cooperates with clamp arm 55 which is mounted for arcuate motion about pivot screw 56 and which terminates in snubbing end 57. Snubbing end 57 is tensioned into normal engagement with bumper 52 by clamp spring 58.

Also mounted on plate 43 is a knife arm 59 which is mounted for pivotal motion with its own pivot screw 60 and which terminates in a cutting anvil 61. This anvil cooperates with a knife edge 62 conveniently formed as a part of spacer 44. Arm 59 is tensioned by spring 63 causing normal engagement between knife edge 62 and anvil 61. A knife and clamp motor 64 which may be electrical, hydraulic or pneumatic is linked as by cable 65 to knife arm 59 and the motion of arm 59 is transmitted to arm 55 by an adjustable sequencing screw 66 mounted in arm 59. Thus when cable 65 is tensioned by motor 64 the first action is the drawing back of anvil 61 from knife edge 62 followed shortly thereafter (i.e. when the end of screw 66 contacts arm 55) by the withdrawal of snubbing end 57 from contact with bumper 52. Upon release of tension in cable 65 both arms, being spring loaded, spring back to their normal positions with the kinetic energy being utilized, in the case of anvil 61 to affect severing of any material between it and knife edge 62.

Mounted on arm 59, near anvil 61 is a displacement hook 67 which spans the gap between anvil 61 and knife edge 62. The purpose of this hook, which moves with the anvil will be explained below. While shown in the shape of a hook in FIGURES 6 and 7, this member may, alternatively, end in a projection extending upward, parallel to the cutting plane between knife edge 62 and anvil 61. It is also preferred to provide the assembly, as shown in FIGURES 6 and 7 with a rest 68 which spans the opening between the knife edge and the anvil at all times at a level below the actually cutting point of knife edge 62. While shown as a piece of rigid wire it may also take the form of an upward projection from bottom plate 43.

The method of the invention will now be considered, particularly in connection with the operation of the apparatus described above. A length of flexible cutter material from spool 48 is lead through wand 49 to the table or top plate 42 where it passes through a cut-out 69 and is engaged by the clamp, that is grasped between snubbing end 57 and bumper 52. This is shown best in FIGURE 2 where the end of the cutter material is designated as 75 and the portion intermediate the end and spool 48 is designated as 76. While the wand is shown here as hollow with the cutting material conducted therethrough, it may obviously assume other shapes with the material passing along the exterior thereof. Referring again to FIGURE 2, the wand is in its upper position and in that position, with the clamp closed, end 75 spans across the longitudinal path of travel of the item to be wrapped. In summary, FIGURE 2 shows an item to be wrapped at a formed (i.e. fold 33 and heat sealed edge 35) package site with a length of flexible cutter having its distal end grasped within the site and having its other end stored remote from the site for free release. The item to be wrapped is now advanced, along with the packaging site onto conveyor 24 and moved to a position shown in FIGURE 3. In this position, when sealing frame 26 descends, heated wire 28 will seal the two open sides. However, in being advanced from the position shown in FIGURE 2 to the position shown in FIGURE 3, the item has drawn with it cutter material from intermediate portion 76 and this has been wrapped about the item. End 75, shown in FIGURE 5 is still retained in the clamp and remains in that position as long as sealing frame 26 is in the position shown with dotted lines in FIGURE 3. To affect sealing, frame 26 is brought down and it has been shown stopped about half way down in FIGURE 3 merely for narrative purposes.

When the frame 26 reaches the position shown in FIGURE 3, motor 64 is activated, as by a microswitch $S_2$ and tensions cable 65. Arm 59 begins moving first under this tension, carrying with it hook or projection 67 which engages the clamped end 75 of the cutter material. At about this time, depending upon its adjustment, sequencing screw 66 hits arm 55 and its arcuate motion causes a gap to appear between bumper 52 and snubbing end 57 so that the grasped end is released and thereafter displaced by travel of hook 67. This action is extremely fast and the hook actually impacts the end of the cutter material. If the straight projection variant of member 67, referred to above, is used instead of a hook shape, the action may be described as a whipping one (particularly when the cutter material has been stiffened by immersion or coating in a coefficient of friction enhancing fluid prior to use) which results in the tucking of this whipped end into the confines of the package overwrap.

Sealing frame 26 is now brought down to the position shown in FIGURE 4 where it seals the open edges of the package and simultaneously forms a pocket which constitutes the site for the next package. At this time, pivot motor 51 activated as by microswitch $S_3$, causes the nutating wand 49 to assume its lower position, as shown in FIGURE 4. Activation of $S_3$ also causes motor 64 to cease operation and, on release of tension in cable 65, springs 58 and 63 restore arms 55 and 59, respectively, to their original positions.

It will be recalled that when the knife opened, hook 67 displaced the distal end of the cutter material which had been underneath the item as shown in FIGURES 2, 3 and 5. This occurred just when said end had been unclamped. Thereafter, wand 49 nutated so that its terminus 50 entered, through cutout 69, into the space between plates 42 and 43. Since, at this time, the old end had been whipped or hooked out of the way and the tension on cable 65 had caused burner 52 and snubbing end 57 to be held spaced apart, the wand, in effect, lays intermediate cutter material portion 76 (coming from across the top of the packaged item) into the jaws of an open clamp. As soon as this happens, the sequencing is such that motor 64 ceased to operate. Consequently, there is first a clamping of this intermediate portion, forming a new end portion 75 for the next cycle of operation and, thereafter (as the anvil 61 springs back against knife edge 62) a severing of cutter material. What is severed is the cutter material which has been guided around the top of the package by the wand and held in the vicinity of the knife when the wand is in its lower position by the combined factors of the location of the wand terminus behind the clamp and the guide 68 holding the material up within the cutting zone. While not essential, rest 68 helps position the cutter material so that it will be properly severed.

When sealing frame 26 is again raised, $S_1$ reverses motor 51, which raises the wand 49 so that once again cutter material spans across the path of travel of the next item to be wrapped and the method of the invention can again be practiced. This cycle of operation can be achieved in a variety of alternative manners well known to those of ordinary skill in the art and the above description is merely exemplary of means for sequentially operating, clamp, knife and wand. In its upper position wand 49 is counterweighted for floating contact with the surface of the item being wrapped since, if floating contact with the item is maintained as it passes beneath the wand, the cutter can be laid about it with a minimum of slack and tensioning of the cutter assured at the time it is severed.

Although my invention has been described in considerable detail, such description is intended to be illustrative rather than limiting since the invention may be variously embodied. Therefore, the scope of the invention is to be determined only by the appended claims.

Having described my invention, I claim:

1. A method of positioning a flexible cutter about an item to be overwrapped with film comprising the steps of:
    (a) forming a package site between two pieces of flexible film in a generally horizontal plane
    (b) providing a length of flexible cutter, the distal end of which is grasped within said site and the proximal end of which is stored for free release remote from said site
    (c) placing into said site, in contact with an intermediate portion of said cutter, an item to be overwrapped with film
    (d) advancing said item and said site a predetermined distance along said horizontal plane, with respect to both said grasped distal end and said stored proximal end, whereby a predetermined length of cutter is paid out about said item
    (e) releasing the distal end of said cutter
    (f) grasping a new intermediate portion of said cutter located between the item and the stored portion, and
    (g) severing the cutter between the newly grasped portion and the item
        whereby said newly grasped portion becomes the distal end of the cutter and the item within the packaging site has had a predetermined length of flexible cutter wrapped about it.

2. The method of claim 1 which includes the additional step of spacing apart the two severed ends of the length of cutter material which is wrapped about the item.

3. The method of claim 2 wherein one end extends beyond the item to be wrapped and the other end is tucked under said item.

4. Apparatus for positioning a length of flexible cutter material about an item to be overwrapped with flexible film comprising:
    (a) a housing including a table portion, located between two lengths of converging film, for receiving an item to be overwrapped; and a spindle, remote from said table portion, for releasably storing a supply of flexible cutter material;
    (b) a nutating wand for conducting cutter material from said spindle to said table, said wand having an upper and a lower position with respect to said table;
    (c) a clamp located within said table for releasably retaining the end of the cutter material lead thereto from the spindle by said wand;
    (d) a knife proximate said clamp for severing cutter material at a point beyond said clamp and
    (e) means for sequentially operating said clamp, knife and wand whereby:
        (1) when said wand is in its upper position, the clamp is closed and cutter material spans, from the end of the wand to the clamp, across the longitudinal path of travel of an item to be wrapped, said item drawing fresh cutter material off said spindle as it proceeds a predetermined distance past said clamp,
        (2) said clamp opens and releases the old end of the cutter material,
        (3) said wand assumes its lower position, thus permitting the clamp to engage a new portion of cutter material proximate the wand terminus,
        (4) the clamp closes on the new cutter portion and said knife severs the old cutter material which still connects the item to be wrapped and the clamp, and
        (5) the wand assumes its upper position so that cutter material again spans across the path of travel of the next item to be wrapped.

5. The apparatus of claim 4 which further includes means for horizontally spacing apart the ends of the length of cutter material which has been wrapped about said item.

6. The apparatus of claim 4 which further includes means for whipping the old end of the cutter material, which is released when said clamp opens, in the direction of travel of the item being overwrapped.

References Cited

UNITED STATES PATENTS 3,191,355  6/1965  Morpurgo _____ 53—134

TRAVIS S. McGEHEE, Primary Examiner

NEIL ABRAMS, Assistant Examiner

U.S. Cl. X.R.

53—133